(12) United States Patent
Johnson et al.

(10) Patent No.: US 9,213,222 B2
(45) Date of Patent: Dec. 15, 2015

(54) CONTROL ARM FOR AN IMAGING DEVICE

(71) Applicants: Joseph M. Johnson, San Luis Obispo, CA (US); Verent Chan, San Luis Obispo, CA (US)

(72) Inventors: Joseph M. Johnson, San Luis Obispo, CA (US); Verent Chan, San Luis Obispo, CA (US)

(73) Assignee: Really Right Stuff, LLC, San Luis Obispo, CA (US)

( * ) Notice: Subject to any disclaimer, the term of this patent is extended or adjusted under 35 U.S.C. 154(b) by 0 days.

(21) Appl. No.: 14/247,086

(22) Filed: Apr. 7, 2014

(65) Prior Publication Data

US 2014/0301730 A1 Oct. 9, 2014

Related U.S. Application Data

(60) Provisional application No. 61/809,085, filed on Apr. 5, 2013.

(51) Int. Cl.
*G03B 17/56* (2006.01)
*F16M 11/00* (2006.01)
(52) U.S. Cl.
CPC .............. *G03B 17/561* (2013.01); *F16M 11/00* (2013.01)

(58) Field of Classification Search
CPC . G03B 17/56; F16M 13/02; F16M 2200/041; F16M 2200/022; F16M 11/04; H04N 5/2251; F21V 21/29
USPC ........... 396/428, 419, 421; 348/373; 248/568, 248/414
See application file for complete search history.

(56) References Cited

U.S. PATENT DOCUMENTS

| | | | | | |
|---|---|---|---|---|---|
| 2,567,068 | A | * | 9/1951 | Halmer | 248/184.1 |
| 4,736,217 | A | * | 4/1988 | McDowell | 396/428 |
| 4,886,230 | A | * | 12/1989 | Jones et al. | 248/170 |
| 5,154,382 | A | * | 10/1992 | Hoshino | 248/185.1 |
| 6,707,501 | B1 | * | 3/2004 | McKay et al. | 348/373 |
| 2013/0221174 | A1 | * | 8/2013 | Sapper et al. | 248/218.4 |

* cited by examiner

*Primary Examiner* — Rochelle-Ann J Blackman
(74) *Attorney, Agent, or Firm* — Chernoff Vilhauer McClung & Stenzel, LLP

(57) ABSTRACT

A tripod head suitable for holding an imaging device thereon being supported by a tripod includes the tripod head being movable to position the imaging device at a desired orientation. A control arm is affixed to and movable in a two-dimensional arc, without being movable in three-dimensions over the two-dimensional arc, with respect to the tripod head. The control arm has selectable resistance to movement along the two-dimensional arc as a result of selectively increasing or decreasing the resistance between at least three friction plates having surfaces in face-to-face engagement with one another.

11 Claims, 4 Drawing Sheets

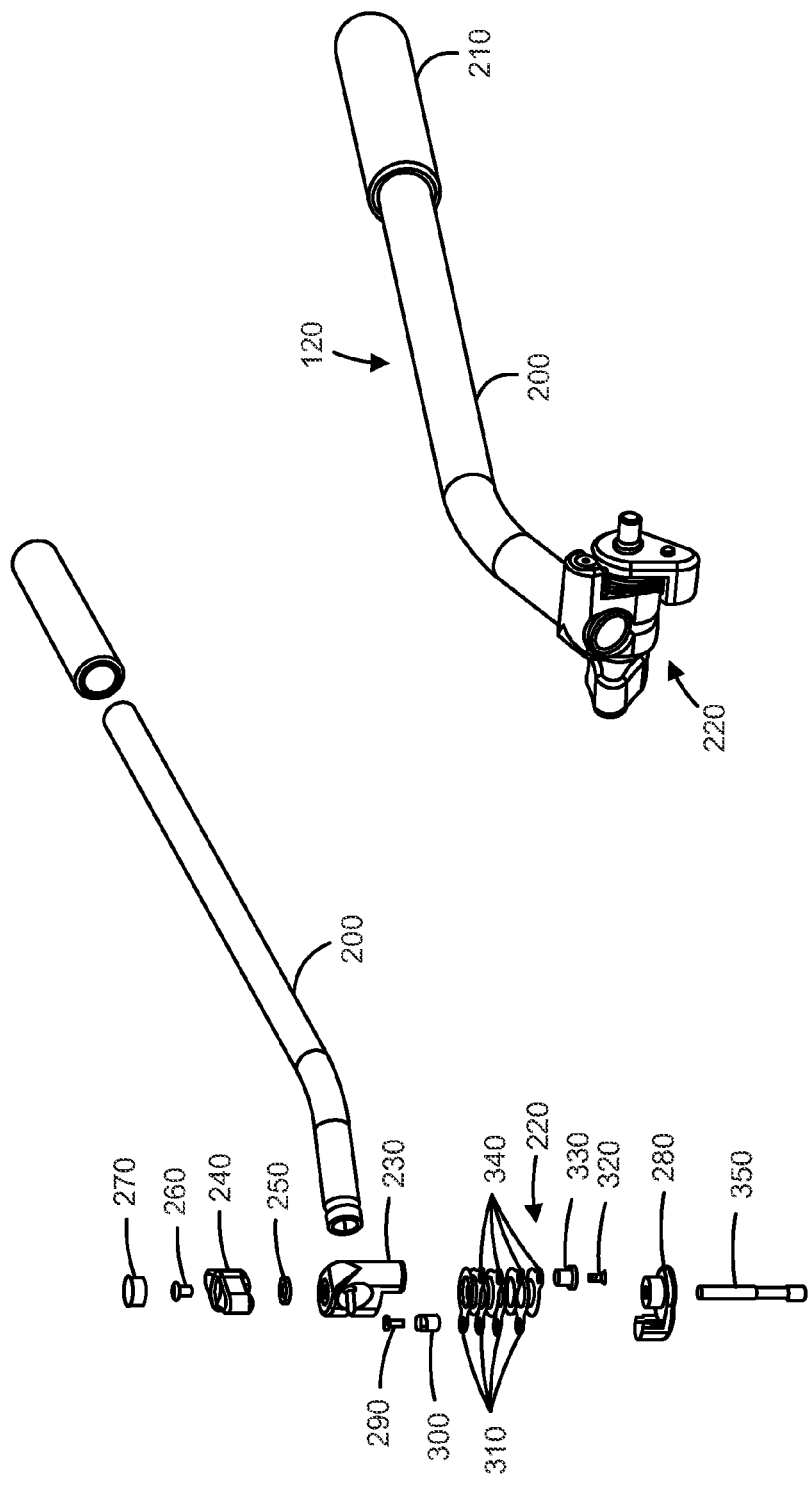

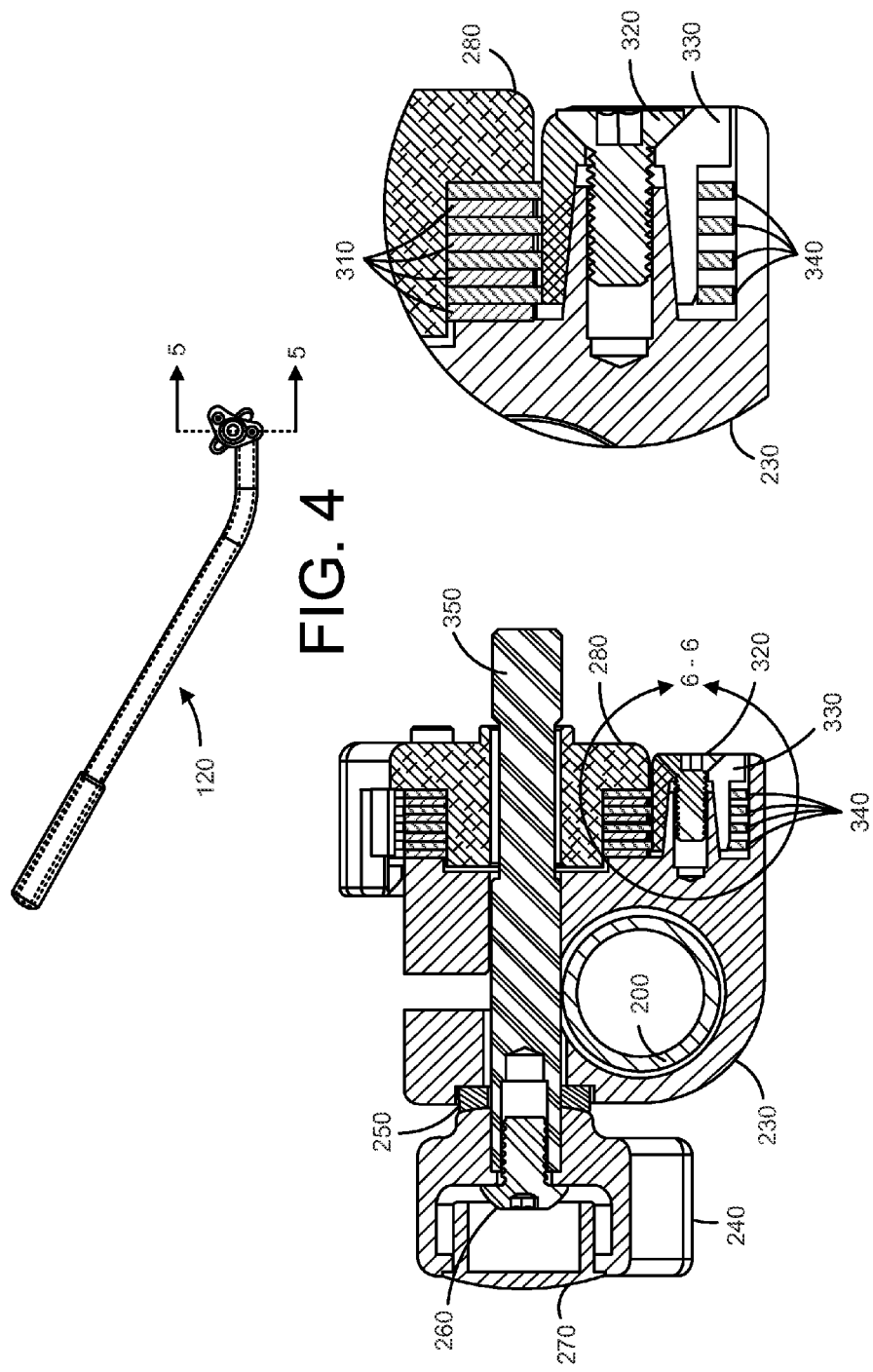

CONTROL ARM FOR AN IMAGING DEVICE

CROSS REFERENCE TO RELATED APPLICATIONS

This application claims the benefit of U.S. Provisional App. No. 61/809,085, filed Apr. 5, 2013.

BACKGROUND OF THE INVENTION

The present invention relates to a control arm for a tripod head.

A tripod head is the part of a tripod system that attaches the supported device (such as a still camera or a movie camera) to the tripod legs, and allows the orientation of the device to be manipulated or locked down. Modular or stand-alone tripod heads can be used on a wide range of tripods, allowing the user choose which type of head best suits their needs. Integrated heads are built directly onto the tripod legs. The various types of tripod heads provide different control mechanisms and have distinct applications. Some can restrict movement to a single axis, while others offer robotic movement to increase the precision of the movements. The materials used to construct tripod heads and the physical designs of various heads can be different, depending on their intended use.

Often, the tripod head includes a generally cylindrical housing, which has a connection mechanism at one end for a tripod. A ball member in the housing is movably engaged and is provided with a locking device at one end thereof for supporting the optical instrument. In the tripod head of this type, the ball member is generally a spherical ball having an extension for connecting to a locking device, and the locking device normally consists essentially of a split clamp having a recess adapted to mate with a plate attached to the optical instrument, and a clamping screw for securing the ball in place in the housing.

Fluid based tripod heads are often used with video cameras. They provide smooth free movement, even with the heaviest of provisional video cameras. The fluid within the head reduces the likelihood of the user introducing any jerkiness or vibration to the shot during a pan or tilt through dampening, and also reduces the friction between moving parts of the head.

In general, the principal function of tripod heads are to provide the ability to hold the attached device fixed in a specific orientation until the user desires to change its position. In the case of a photographic camera, this can help reduce vibration that would appear when using relatively slow shutter speeds while still being able to quickly recompose for another shot, or allow for very long exposures. In cinematography or video applications, a tripod head allows the camera operator to pan and tilt with much more control when compared to hand-holding the camera. Often to assist with the operation of the tripod head, a control arm is included that is interconnected to the tripod head. Unfortunately, often the position of the control arm is not suitable for optimal control of the tripod head. For example, at times the control arm may be to high for optimal use, may be to low for optimal use, or otherwise should be modified to avoid obstacles near the tripod head, such as tree branches. Moreover, the control arm should be freely adjustable to a desirable location while operating the imaging device.

What is desired therefore is a modified control arm suitable for being freely adjustable to a desirable location while operating the imaging device.

BRIEF DESCRIPTION OF THE DRAWINGS

FIG. 2 illustrates a pictorial view of the control arm of FIG. 1 together with a securement assembly.

FIG. 3 illustrates a break apart view of the securement assembly of FIG. 2.

FIG. 4 illustrates a pictorial view with hidden lines of the control arm of FIG. 1 at a different orientation.

FIG. 5 illustrates a cut away view of the securement assembly along line 5-5 of FIG. 4.

FIG. 6 illustrates a detailed view of a portion of the securement assembly along line 6-6 of FIG. 5.

DETAILED DESCRIPTION OF THE PREFERRED EMBODIMENT

Figure 1:
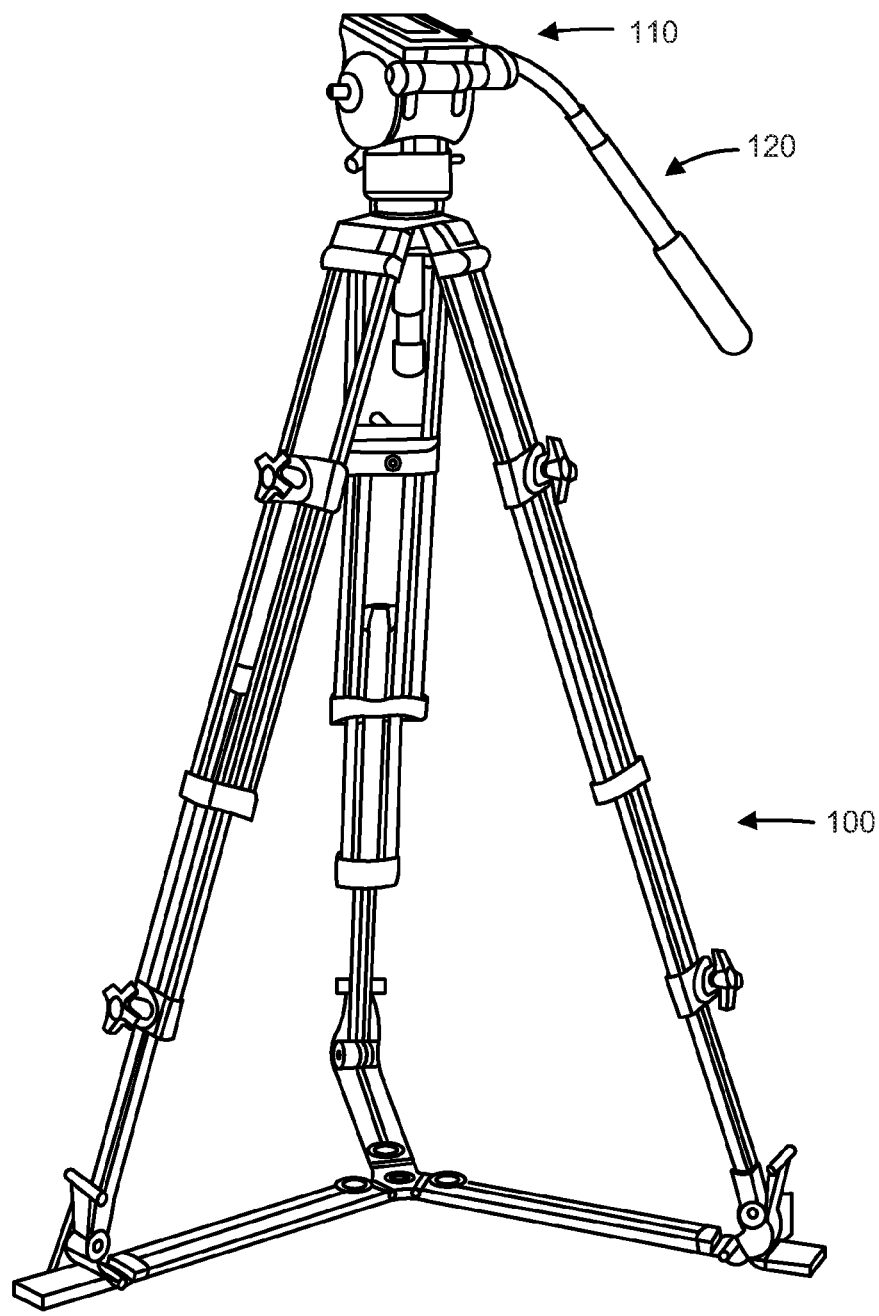
FIG. 1 illustrates a tripod, tripod head, and control arm.

Referring to FIG. 1, a tripod 100 may include one or more legs together with a tripod head 110 supported by the tripod 100. The tripod head 110 is suitable to support an imaging device thereon, such as a photographic camera and/or a video camera. A control arm 120 may be used to assist with the movement of the tripod head 110, such as in a vertical direction, a horizontal direction, or any other direction permitted by the tripod head. The control arm 120 is adjustable relative to the tripod head 110 to be suitable for the particular user, suitable for the particular imaging device, and suitable for the particular imaging location.

Referring to FIG. 2, the control arm 120 may include a bent shaft 200 or a straight shaft, as desired. The bent shaft 200 may include a foam handle 210 that is securely inserted over one end portion of the bent shaft 200. The bent shaft 200 may include a securement assembly 220 that is securely affixed to the other end portion of the bent shaft 200. The securement assembly 220 is designed in such a manner that it includes the ability to be positioned at any suitable position along its range of motion. Moreover, the range of motion of the bent shaft 200 is preferably limited by the securement assembly 220 to a two-dimensional range along an arc.

Referring to FIG. 3, the securement assembly 220 includes an arm head 230 that is secured to the bent shaft 200, preferably in a manner such that the bent shaft 200 is not rotatable with respect to the arm head 230 when secured. A screw knob 240 may be rotatably connected to the arm head 230 using a spherical washer 250 and a screw 260. A knob cap 270 may be affixed to the arm head 230 to cover head of the screw 260. A screw 290 is secured to an arm base 280. In particular the screw 290 is secured to an expanding collet 300 which is secured to the arm base 280. The expanding collet 300 may be positioned through a set of openings in a set of friction plates 310, each of which are spaced apart from one another. When the screw 290 is secured to the expanding collet 300 the friction plates 310 are maintained in a fixed position. A screw 320 is secured to the arm head 230. In particular the screw 320 is secured to an expanding collet 330 which is secured to the arm head 230. The expanding collet 330 may be positioned through a set of openings in a different set of friction plates 340, each of which are spaced apart from one another. When the screw 320 is secured to the expanding collet 330 the friction plates 340 are maintained in a fixed position. A locking stud 350 is positioned through the arm base 280, the friction plates 310, the friction plates 340, the arm head 230, the spherical washer 250, the screw knob 240, to the screw 260. The first set of friction plates 310 are interspaced with the second set of friction plates 340 in such a manner that there is a plurality of surfaces that may provide frictional resistance to movement along a two-dimensional range of motion when the arm base 280 is secured to the tripod head. Rotating the screw knob 240 selectively increases or decreases the frictional resistance by increasing or decreasing, respectively, the pressure exerted on the stack of friction plates. Thus with low resistance on the friction plates the control arm may be readily positioned. Then by turning the screw knob, the friction provided by the friction plates may be substantially increased to maintain the control arm in a desired position. Also, the frictional resistance is generally linear within the useful operating range of the screw knob.

Referring to FIG. 4, another view of the control arm 120 is illustrated showing a side view of the securement assembly 220. Referring to FIG. 5, a cross sectional view of the securement assembly 220 is illustrated. The assembly of the locking stud 350, spherical washer 250, the screw knob 240, and the screw 260 is illustrated. Turning the screw knob 240 increases the surface friction for the friction plates 310 and 340. Referring to FIG. 6, a more detailed view of the frictional plate assembly is illustrated. The expanding collets 300, 330 maintains the sets of frictional plates 310, 340 in a spaced apart relationship and reduces them from freely moving around.

Figure 7:
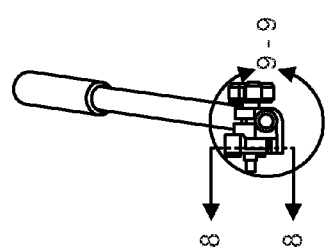
FIG. 7 illustrates a pictorial view with hidden lines of the control arm of FIG. 1 at a different orientation.
Figure 8:
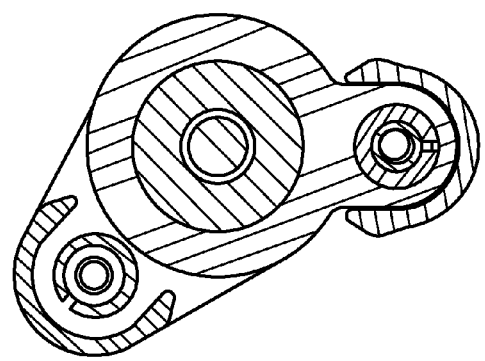
FIG. 8 illustrates a cut away view of the securement assembly along line 8-8 of FIG. 7.
Figure 9:
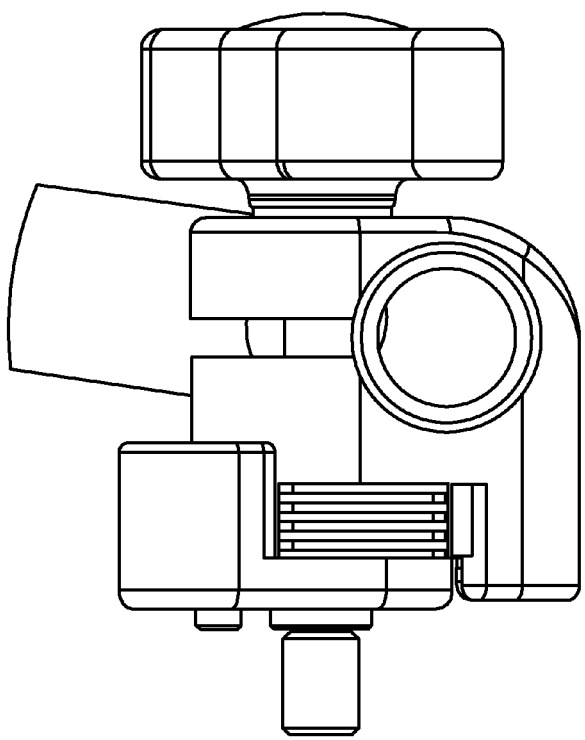
FIG. 9 illustrates a detailed view of a portion of the securement assembly along line 9-9 of FIG. 7.

Referring to FIG. 7, another view of the control arm 120 is illustrated showing an end view of the securement assembly 220. Referring to FIG. 8, a cross sectional view of the side of the securement assembly 220 is illustrated. The stack of friction plates 310, 340 are illustrated with the expanding collets. Referring to FIG. 9, a more detailed view of the end portion of the securement assembly 220 is illustrated.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A tripod head having an upper surface suitable for holding an imaging device thereon being supported by a tripod comprising:
    (a) said upper surface of said tripod head being movable to position said imaging device at a desired orientation;
    (b) a control arm affixed to said tripod head and movable in a two-dimensional arc, without being movable in three-dimensions over said two-dimensional arc, relative to said upper surface of said tripod head;
    (c) said control arm having selectable resistance to said movement along said two-dimensional arc as a result of selectively increasing or decreasing the resistance between at least three friction plates having surfaces in face-to-face engagement with one another, such that said movement of said upper surface of said tripod head relative to the orientation of said control arm has said selectable resistance.

2. The tripod head of claim 1 wherein said control arm includes a bent shaft.

3. The tripod head of claim 1 wherein said control arm includes a foam handle.

4. The tripod head of claim 1 wherein said control arm includes a securement assembly securely affixed to an end portion of said control arm, where said securement assembly is securely affixed to said tripod head.

5. The tripod head of claim 4 wherein said securement assembly includes a rotatable knob to selectively increase and decrease said resistance between said at least three friction plates.

6. The tripod head of claim 5 wherein said rotatable knob includes a securement member positioned at least partially through said rotatable knob.

7. The tripod head of claim 6 wherein said rotatable knob includes a cap enclosing an end of said securement member within said rotatable knob.

8. The tripod head of claim 4 wherein said securement assembly includes a first plurality of at least two friction plates maintained in a fixed position with respect to one another.

9. The tripod head of claim 8 wherein said securement assembly includes a second plurality of at least two friction plates maintained in a fixed position with respect to one another.

10. The tripod head of claim 9 wherein each of said first plurality of friction plates are in said face-to-face engagement with respective ones of each of said second plurality of friction plates.

11. The tripod head of claim 10 wherein said first plurality of friction plates and said second plurality of friction plates form a stack of friction plates arranged as a first one of said first plurality of friction plates, a first one of said second plurality of friction plates, a second one of said first plurality of friction plates, and a second one of said second plurality of friction plates.

\* \* \* \* \*